United States Patent [19]

Morris

[11] Patent Number: 4,587,714

[45] Date of Patent: May 13, 1986

[54] MANUFACTURE OF MOTOR WITH SPLIT BACK MAGNET ARRAY

[75] Inventor: Frank I. Morris, San Jose, Calif.

[73] Assignee: Memorex Corporation, Santa Clara, Calif.

[21] Appl. No.: 567,728

[22] Filed: Jan. 3, 1984

Related U.S. Application Data

[62] Division of Ser. No. 512,876, Jul. 12, 1983.

[51] Int. Cl.$^4$ ............................................. H04R 31/00
[52] U.S. Cl. ...................................... 29/594; 29/603; 29/607; 310/152; 179/115.5 R
[58] Field of Search ................... 29/594, 602 A, 603, 29/607, 608; 179/115.5 R, 117, 119 R; 310/152; 335/306; 363/43, 126

[56] References Cited

U.S. PATENT DOCUMENTS

| | | | |
|---|---|---|---|
| 3,028,660 | 4/1962 | Stratton et al. | 29/608 X |
| 3,417,268 | 12/1968 | Lace | 179/115.5 R X |
| 3,521,092 | 7/1970 | Kalthoff | 360/106 X |
| 4,395,598 | 7/1983 | Lesage | 179/115.5 R X |

Primary Examiner—Howard N. Goldberg
Assistant Examiner—Timothy V. Eley
Attorney, Agent, or Firm—John J. McCormack; Nathan Cass; Kevin R. Peterson

[57] ABSTRACT

A disc drive arrangement including RW head actuator driven by an improved voice coil motor, having ceramic back-magnets which are subdivided to give improved magnetic characteristics and operation (increased working flux and an increase in efficiency and effective power acceleration for given current—e.g., thus decreasing "access time").

15 Claims, 8 Drawing Figures

TYPICAL M⁻ DEMAGNETIZATION CURVE AT 20°C

Ⓐ FLUX DENSITY AVAILABLE TO VCM ASSEMBLY BY "ONE-PIECE" BACK MAGNET.

Ⓑ FLUX DENSITY AVAILABLE TO VCM ASSEMBLY BY "HALVING" THE BACK MAGNETS.

MANUFACTURE OF MOTOR WITH SPLIT BACK MAGNET ARRAY

This is a division, of application Ser. No. 512,876 filed July 12, 1983.

This case relates to disc drive arrangements and head actuators therefor, and more particularly to improvements in associated actuator-motor means.

BACKGROUND, PROBLEMS

The present invention concerns magnetic disc drive (DD) assemblies and particularly the structure of voice coil motors for DD actuators.

Workers in the art of making and using magnetic disc drives for storage of digital data for computer and other applications are attuned to today's thrust to make these more cost-effective. The present invention relates to improvements in the actuator mechanism and, more particularly, in the voice coil motor portion thereof in order to enhance actuator efficiency and access time.

Context of Invention, Disc Drive, VC Motor, FIGS. 1-3

FIG. 1 shows a very schematic side-view of a disc drive (DD) module of improved construction. Of particular interest here is the head-disc assembly (HDA) shown in more detail in FIG. 2, with the (dual) actuators therefor being driven by an associated voice coil motor (VCM) as workers in the art will understand. Both the HDA and VCM are mounted as part of a "deck plate" assembly as schematically indicated. The deck plate assembly will be understood as comprising a deck plate mounting the dual-voice coil motor (VCM), the drive-blower motor, the drive belt and its cover, and the HDA mounting hardware.

This HDA is characterized by a dual-actuator mechanism, including a pair of actuators each capable of covering one-half of the HDA storage area and being adapted, as workers will understand, to position and move a set (preferably 16) of read/write transducers across prescribed respective disc surfaces.

The dual-actuator assembly comprises two carriages, each carrying four head arm assemblies. Each head arm assembly carries four read/write heads. The carriage is fitted with a voice coil which moves in the magnetic air gap of the VCM. Note that, preferably, each actuator here carries 16 thin-film heads, one for servo use and the other 15 for read/write functions. The actuators are separately addressable and also include a portion of the HDA electronics.

Preferably this is a Winchester type HDA consisting of nine 14" magnetic discs installed on a common horizontal spindle with two actuators. The spindle will be rotated in a known fashion (e.g., at a nominal 3600 rpm, as controlled by a drive-blower motor), allowing the heads to fly slightly above disc surfaces when the discs are rotating, and also insuring that the HDA is free of contaminating particles. This drive-blower motor (mounted on the deck plate as indicated) is an integral part of both the HDA and the air flow-filtration system. The HDA should be sealed and include a set of crash stop assemblies for each actuator.

The VCM itself (see FIG. 3) is—according to my invention—made up of a "ductile iron" housing (31), an aluminum flux collector spacer (33), a "ductile iron" flux collector (35), two pole pieces (3-P and 3-p') of "1018" rolled steel, a top and bottom magnet (m-1, m-4), two side magnets (m-2, m-3), and two "back magnets" (3-M, 3-M'), each bonded to a respective back plate (3-B, 3-B').

The magnets are magnetized in a direction (indicated in FIG. 3) to concentrate the flux in the flux collector 35 and drive it through the air gap via the pole pieces. The magnet area and thickness are designed to ensure that the pole pieces are "saturated" (i.e., the average magnetic induction in the pole pieces is greater than 18,000 gauss). This ensures that there is little or no change in the flux density in the gap due to the demagnetizing effects of operating temperature variation and/or high voice coil currents.

The Problem, FIGS. 3, 5

The arrangement in FIG. 3 represents an efficient VC motor for such uses, one exhibiting superior efficiency and power and decreased "access time". Here, workers will be surprised to see that the back magnet and associated mounting plate has been "split". The more conventional approach (for such a "ceramic magnet array") would be to use a single back magnet on a single mounting plate.

FIG. 5 will be recognized as a Demagnetization curve, plotting coercive force (H) vs. flux density (B) for "standard" conditions (e.g., 20° C., etc.) for such a VCM with single back magnet (curve DM, assume a Barium ferrite magnet), with a typical associated "open circuit load line" OL having a slope (permeance) of 0.31. (Note one must magnetize outside the VCM assembly.) The "operating (VCM) load line" LL intersects curve DM at a flux density value of A; this may be conceptualized as the flux density available to a "conventional" VCM assembly with a one-piece back magnet. (e.g., assume Barium ferrite or like ceramic magnet, such as"8" by Colt Industries, or "8-B" for higher remanance.)

The intersection of load line OL (FIG. 5) with the demagnetization curve for such a magnet, shows that when the back magnet assembly is bolted to the VCM assembly there will be a loss in flux density.

Workers will recognize that a VCM arrangement of magnets and flux carriers like that of FIG. 3 implies the use of ceramic magnets—e.g., as opposed to using an ALNICO magnet, involving higher cost, unstable (Co) sources, etc. Thus, the invention will be limited to instances employing such ceramic magnets.

Splitting the back magnet, as here taught, will be seen to increase flux density—in FIG. 5, to value B, the intersection of "operating load line" LL with modified demagnetization curve DM' associated with "split magnets".

Proposed Solution: (FIG. 4)

It occurred that one might derive some advantage by subdividing the conventional single back magnet—for instance, by halving it along a cutting line C—C, as is indicated for a single back-magnet BM on a single back plate BP in FIG. 4. It was further theorized that one might separate these severed magnet sections and mount each on its own separate back plate. Thus evolved the split magnet arrangement of FIG. 3, as further discussed in EX. I below.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 1 is a very schematic side view of an exemplary disc drive arrangement of the type contemplated; while

FIG. 4 illustrates a single back magnet in plan view; as proposed for "halving"; while

DESCRIPTION OF THE PREFERRED EMBODIMENTS

General Description, Background

Figure 1:
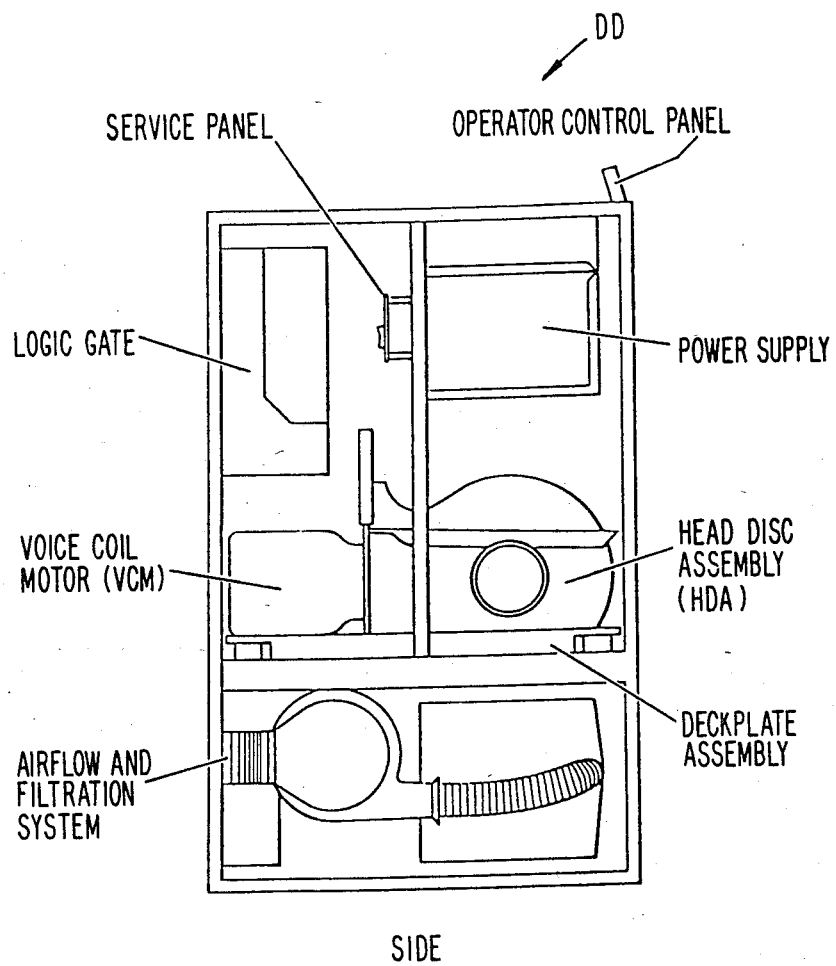
Figure 2:
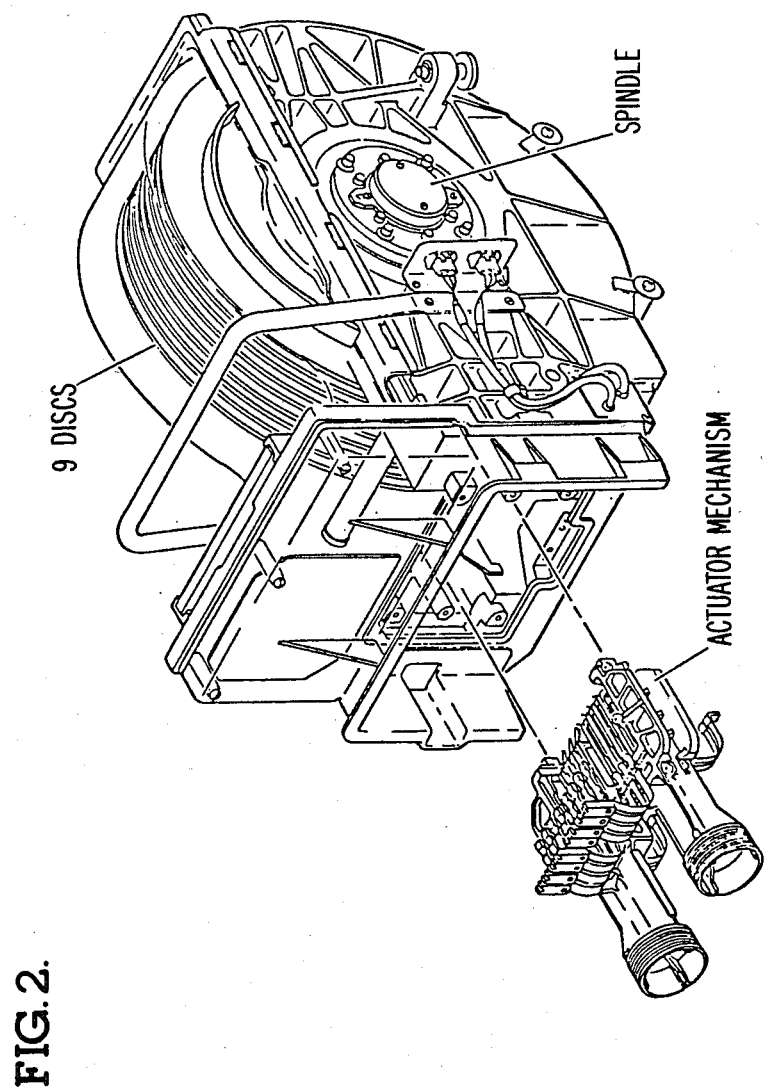
FIG. 2 is an enlarged side view of an associated disc file with dual-actuator mechanism.
Figure 3:
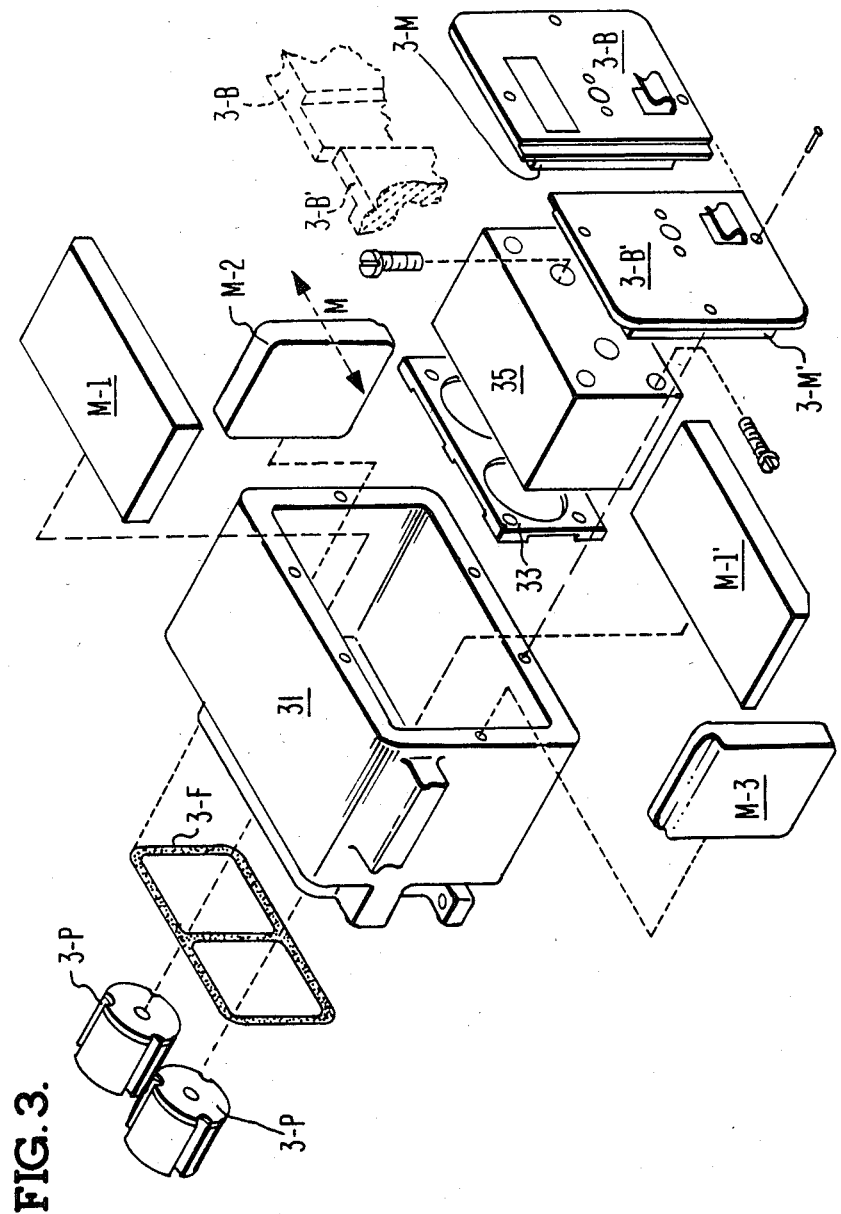
FIG. 3 is an enlarged, exploded view of a contemplated voice coil motor assembly for such an actuator.
Figure 5:
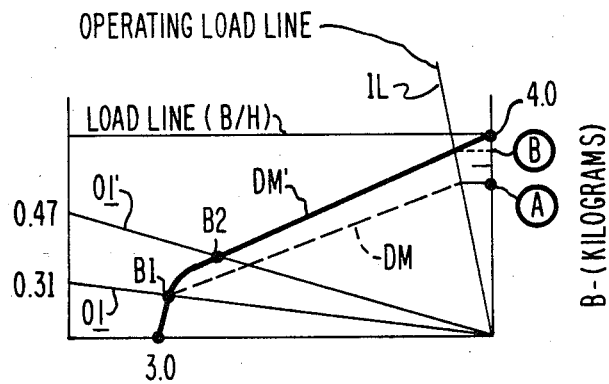
FIG. 5 is an exemplary "Demagnetization" curve indicating representative effects of such "halving".
Figure 6:
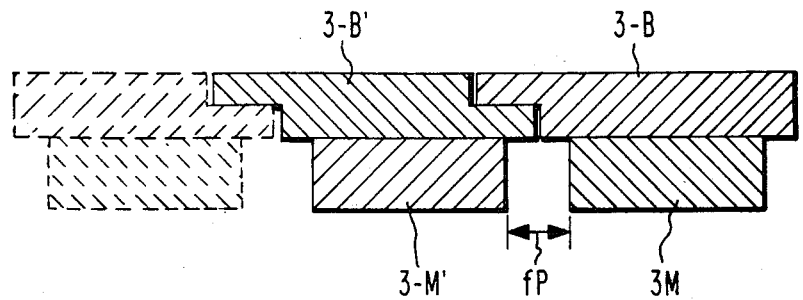
FIG. 6 shows two such halves mounted together in end-view, as in FIG. 3; whereas FIGS. 7A, 7B similarly illustrate cutting a back magnet into thirds.

FIGS. 5, 3, 6, and EX. I schematically illustrate an actuator motor constructed according to principles of this invention. This, and other related motor and actuator means discussed herein, will generally be understood as constructed and operating as presently known in the art, except where otherwise specified. And, except as otherwise specified, all materials, methods and devices and apparatus herein will be understood as implemented by known expedients according to present good practice.

EX. I: FIGS. 3, 5, 6

EX. I will be understood as following the above-indicated concept of subdividing the (conventional, single) back magnet (cf. FIG. 4), resulting in a "split magnet" array as in FIGS. 3, 6. A preferred mode of "splitting" is indicated in FIG. 6 where each magnet-half 3-M, 3-M' is mounted on its own respective, back-plate 3-B, 3-B'. The back-plates are then abutted and fastened to their housing (bolted), leaving magnets typically in "virtual abutment (separated by an infinitesimal spacing "sp"; e.g., a few mils or less, as manufacturing tolerance). Preferably, the back-plates are abutted together in precise alignment—e.g., as indicated at the "dovetail-join" line in FIG. 6. Each magnet is conventionally bonded to its back-plate (e.g., with epoxy). The plates may comprise "10—10 steel" or any conventional low-reluctance material.

The back magnets are identical and comprise a good ferro-magnetic ceramic, such as Barium ferrite (e.g., "8-B" by Colt Industries). This design is optimized for such ceramic magnets (e.g., in respect of thermal stability, with good "flux saturation" maintained as described above).

Results

One is pleased and surprised to discover that this "halving" operation results in an improved load line as indicated in FIG. 5 at OL', with improved slope of 0.47. This results in a flux-meter reading in the working gap of the VCM of the order of $3.1 \times 10^5$ Maxwell turns, where before only about $2.6 \times 10^5$ Maxwell turns would be typical (i.e., before "halving" the back magnets).

As workers will understand, this means more actuator power and higher efficiency for a given VCM current value—thus improving access time: a most important feature.

Further Improvements

As workers in the art will doubtless appreciate, one may further subdivide such back-magnets (e.g., into thirds, quarters, etc.) to get a prescribed improvement in magnetic characteristic (better open circuit load line), consistent with acceptable increase in fabrication time and expense and with some sacrifice in structural rigidity.

Figure 4:
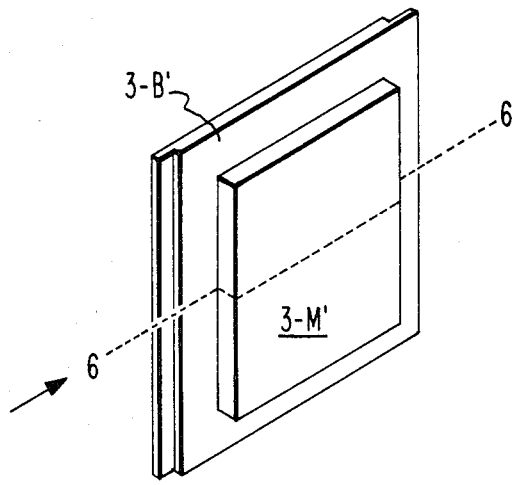
Figure 7A:
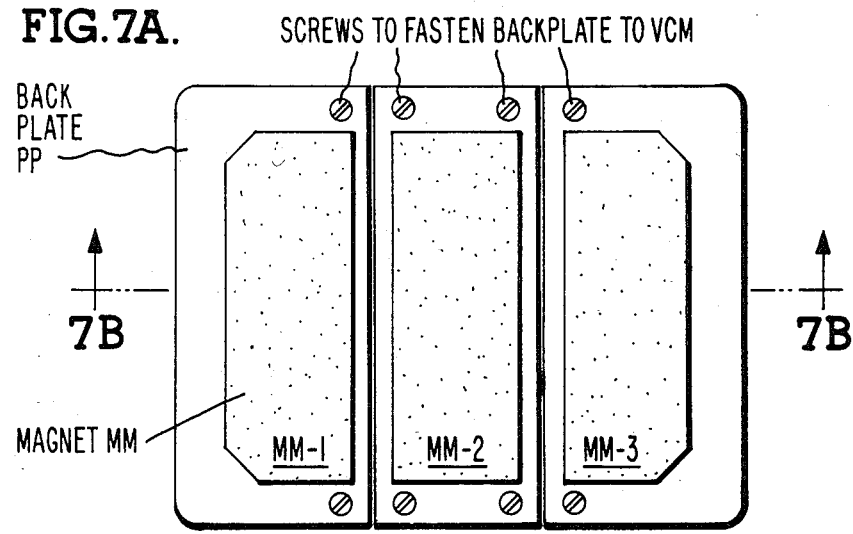
Figure 7B:
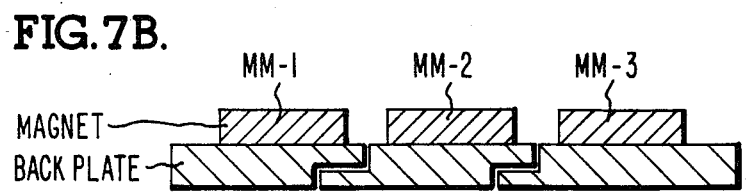

Thus, for example, one may also subdivide the back magnet into "thirds" as indicated in FIGS. 7A, 7B (Compare FIGS. 3, 4 and 6). Here, a representative ceramic back magnet will be understood as subdivided into three (3) identical portions (mm-1, mm-2, mm-3), each bonded to a respective back plate (cf. $PP_1$, $PP_2$, and $PP_3$, respectively) as before, with the plates joined to abut as before to present a composite back plate PP mounting the resultant thirds in virtual abutment as a composite tri-partite magnet MM. Other such magnets are obviously apt for such subdivision with like results.

Conclusion

It will be understood that the preferred embodiments described herein are only exemplary, and that the invention is capable of many modifications and variations in construction, arrangement and use without departing from the spirit of the invention. For example, the means and methods disclosed herein are also applicable to related VC motors for other disc drives and other actuator systems and the like. Also, the invention is applicable in certain aspects for improving other related motors and/or for providing positioning motive means as required for other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. A method of fabricating an improve actuator motor for a disc drive actuator, this motor including magnet means, the magnet means comprising a slab of ferro-magnetic ceramic; the method including:
   splitting this slab at least once to form an array of identical magnet parts.

2. The method of claim 1 wherein the motor is a voice-coil motor and wherein the magnet parts so formed are mounted in virtual abutment, each on a respective backing plate.

3. The product of the method in claim 2.

4. The method of claim 2 wherein the backing plates are joined.

5. The method of claim 4 wherein the backing plates are disposed in aligned abutment within the motor so as to present the so-split magnet parts as virtually touching.

6. The product of the method in claim 5.

7. The pioduct of the method in claim 1.

8. A method of making improved actuator motive means including associated magnet means, this magnet means comprising one or several ceramic magnet-slabs, this method comprising: subdividing at least one of the slabs into two or more identical sub-portions; and recombining these sub-portions as a composite magnet, disposed in the actuator motive means, to enhance flux density.

9. The method of claim 8 wherein the motive means is a voice-coil motor and wherein each said magnet-slab so subdivided has its sub-portions reassembled and mounted in virtual abutment, each on a respective backing plate.

10. The method of claim 9 wherein the slab comprises a back magnet slab cut into identical halves.

11. The method of claim 10 wherein each subdivided slab is thereafter a back magnet so-halved and each half is bonded on a respective backing plate.

12. The method of claim 11 wherein the backing plates are disposed in aligned abutment within a disk drive actuator motor so as to present the so-split magnet halves as virtually touching.

13. The product of the method in claim 12.

14. The product of the method in claim 10.

15. The product of the method in claim 8.

* * * * *